United States Patent [19]
Timberlake et al.

[11] Patent Number: 5,820,000
[45] Date of Patent: Oct. 13, 1998

[54] HANDS FREE GAME CALL HOLDER

[76] Inventors: Mark Timberlake, 1112 W. Rollins Rd., Columbia, Mo. 65203; Edward Leaton, 13001 W. Hwy. 40, Rocheport, Mo. 65279

[21] Appl. No.: 807,906

[22] Filed: Feb. 27, 1997

Related U.S. Application Data

[60] Provisional application No. 60/012,499 Feb. 29, 1996.
[51] Int. Cl.⁶ ........................................ A45F 3/14
[52] U.S. Cl. ........................ 224/219; 224/221; 224/267
[58] Field of Search ...................... 224/181, 219, 224/220, 221, 222, 250, 267; 24/3.2; D3/221, 229

[56] References Cited

U.S. PATENT DOCUMENTS

| | | | |
|---|---|---|---|
| D. 328,820 | 8/1992 | Davie | D3/229 |
| D. 344,411 | 2/1994 | Henry et al. | D3/229 |
| 1,603,044 | 10/1926 | Gise | 224/221 |
| 1,769,241 | 7/1930 | Stephani | 224/221 |
| 2,793,617 | 5/1957 | Palmer | 224/221 |
| 2,961,135 | 11/1960 | Hughes, Jr. | |
| 3,942,194 | 3/1976 | Winter | 224/219 |
| 4,069,954 | 1/1978 | Rauch | 224/219 |
| 4,733,808 | 3/1988 | Turner, Jr. et al. | 224/219 |
| 4,903,932 | 2/1990 | Stewart, Jr. | 224/267 |
| 4,966,322 | 10/1990 | Zagorski et al. | 224/250 |
| 5,111,981 | 5/1992 | Allen | 224/202 |
| 5,217,294 | 6/1993 | Liston | 224/181 |
| 5,385,281 | 1/1995 | Byrd | 224/250 |
| 5,431,590 | 7/1995 | Abbas | 446/207 |
| 5,433,359 | 7/1995 | Flowers | 224/222 |

*Primary Examiner*—Allan N. Shoap
*Assistant Examiner*—Gregory M. Vidovich
*Attorney, Agent, or Firm*—Richard J. Grundstrom

[57] ABSTRACT

The hands free game call holder of this invention has a wrist strap made of a flexible material that is wrapped around the wrist of a hunter. A D-ring is attached to one end of the wrist strap. The other end of the wrist strap is looped thorough the D-ring and folded back and secured onto itself. A primary call holder and a secondary call holder are attached to the wrist strap. The primary and secondary call holders are wrapped or looped about a game call to securely hold a game call on the wrist strap. The primary call holder and the secondary call holder are in alignment and work in conjunction to securely hold a game call in a position accessible to the hunter while the hunter is holding a firearm or bow. Provisions are also included for a second set of primary and secondary call holders to be attached to the wrist strap for holding a second game call parallel to the first.

5 Claims, 6 Drawing Sheets

HANDS FREE GAME CALL HOLDER

This is a continuation of provisional application filed Feb. 29, 1996, Ser. No. 60/012,499.

BACKGROUND OF THE INVENTION

This invention relates generally to game call holders, and more particularly to game call holders for holding a game call (used in hunting wild game) onto a hunter's wrist.

There are presently game call holders for holding a game call. These holders commonly have a simple lanyard tied around the call on one end and tied in a loop around the hunter's neck on the other so that the call (or calls) hangs around his neck. When the hunter wishes to use a call, which is from the time game is sighted through the time of the shot, he must move and occupy one hand until the moment has come to attempt a shot. Then he must drop the call (creating undesirable movement), pick up his weapon, and attempt the shot. During the shot, the call on the lanyard has a tendency to be noisy, hard to locate again should it be necessary, and can swing into the way of a bow or firearm, affecting the accuracy of the shot.

It is also known to attach a game call holder to a wrist band strapped around the hunter's wrist. This game call holder comprises an elongated elastic tube sewn onto the top of the wrist band. The game call is inserted into the tube, causing the elastic tube to expand around the call. One disadvantage of this holder is that the elastic tube limits the size range of the game calls which can be held by the holder. The game call can also work loose from the elastic tube or be accidentally pushed out of the elastic tube.

There is a need, therefore, for a game call holder which attaches to the hunter's wrist, is adaptable to a wide range of game call sizes and prevents the came call from working itself loose or from being accidentally pushed out of the holder.

SUMMARY OF THE INVENTION

The purpose of this holder is to hold a game call (used in hunting wild game) onto a hunter's wrist, leaving his hand free to use for other things instead of being used to hold the call.

The holder of this invention eliminates the flaws in the lanyard method by placing the call on the wrist of the hunter (normally the right wrist for the right handed hunter) where it does not require a hand to physically hold it, allowing him to hold his weapon at the ready during the entire calling phase, and also leaving it near his mouth for additional calls when the game is at or near range, with the weapon already in the firing position. In addition, this device keeps the call(s) in a much less obstructive position, eliminating interference with the shot and/or noise and commotion during entanglement or while searching for the call when it is kept on the lanyard.

The holder of this invention also eliminates the disadvantages of known holders attached to wrist straps. The holder has a primary and secondary means for holding the game call on the hunter's wrist to prevent the game call from working itself loose or from being accidentally jarred loose from the holder. Both the primary and secondary means for holding the game call are adjustable to a wide range of game call sizes.

DETAILED DESCRIPTION OF THE PREFERRED EMBODIMENTS

Figure 1:
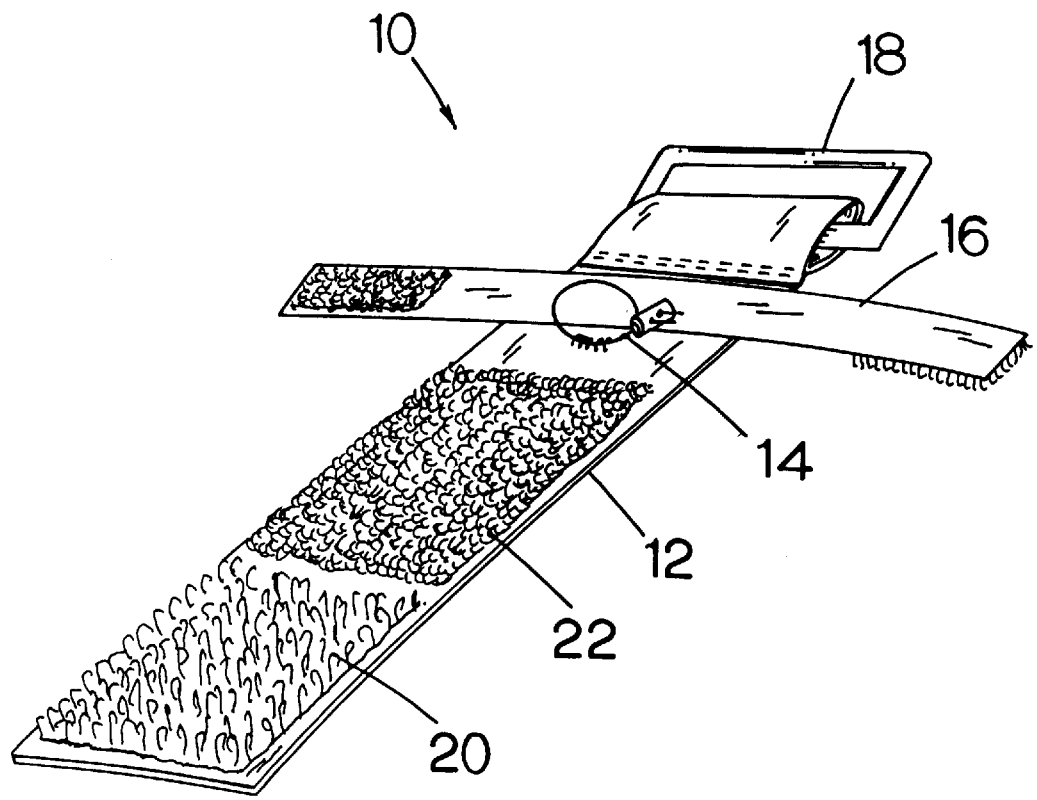
FIG. 1 is a perspective view of a hand free game call holder unattached from a hunter's wrist.

Referring to the drawings in general, the principle embodiments of the hands free game call holder 10 are illustrated by example and are herein described.

As shown in FIG. 1, the game call holder 10 of this invention includes a primary call holder 14 and a secondary call holder 16, both attached to a wrist strap 12. The wrist strap 12 includes a flexible strap of material and a D-ring 18. One end of the wrist strap 12 is looped through the D-ring 18 and sewn back onto itself. The other end of the strap includes a hook portion 20 and a loop portion 22 of a hook-and-loop type fastener in side-by-side arrangement. The wrist strap 12 is wrapped around the hunter's wrist, looped through the D-ring 18 and folded back onto itself such that the hook portion 20 and loop portion 22 intermingle to hold the wrist strap 18 securely on the hunter's wrist. The hook and loop portions, 20 and 22 are arranged such that the wrist strap 12 is adjustable to various wrist sizes. The fastener used to fasten the ends of the wrist strap 12 together may be of a type other than a hook-and-loop fastener, including snaps, buttons with button holes, clamps, buckles and other common types of fasteners and still remain within the scope of this invention.

Figure 4:
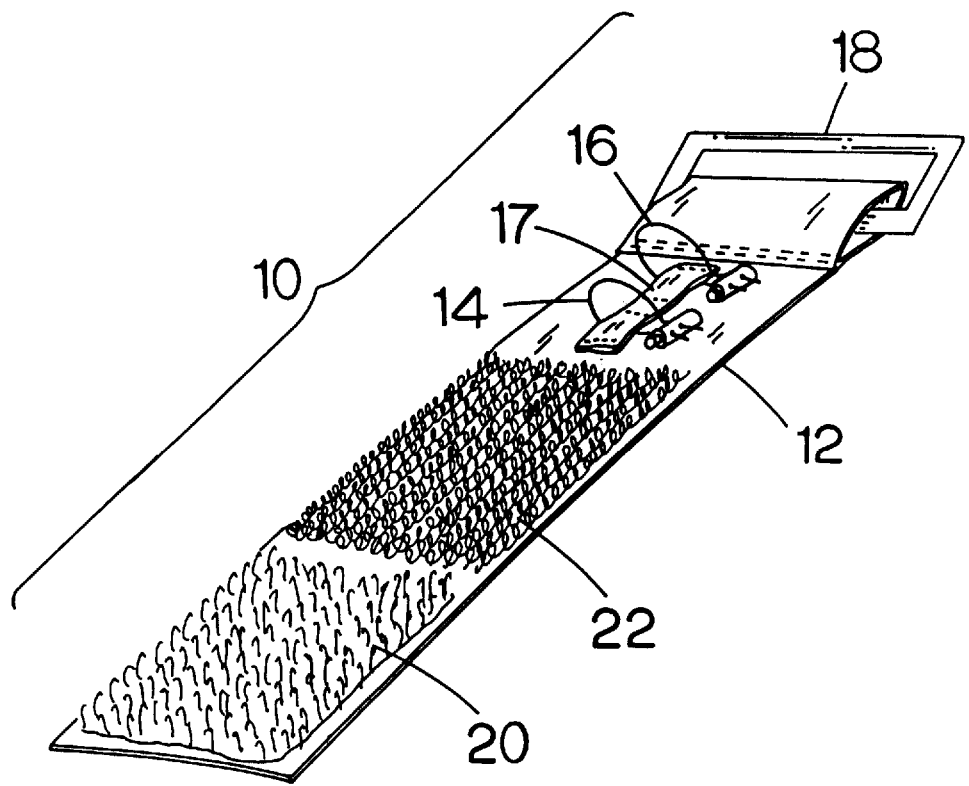
FIG. 4 is a prospective view of a second embodiment of the hands free game call holder unattached from a hunter's wrist.
Figure 5:
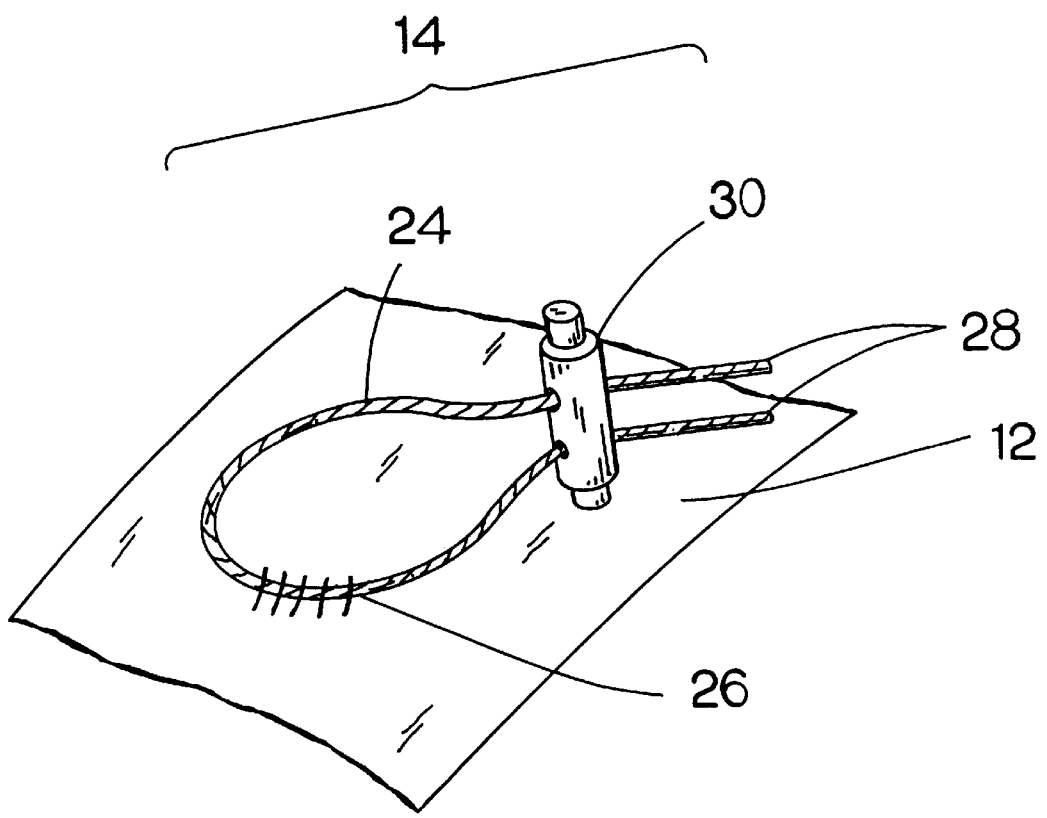
FIG. 5 is a perspective view of a call holder consisting of a cord and cord clamp arrangement attached to a wrist strap.

The primary call holder 14, in the preferred embodiment as illustrated in FIG. 5, consist of an elastic cord 24 having a central portion 26 between opposing ends 28. A patch 17 may be sewn over the secondary call holder 16 to help secure the secondary call holder 16 to wrist strap 12, as illustrated in FIG. 4. The central portion 26 of the cord is sewn onto the top of the wrist strap 12 to securely attach the cord to the wrist strap. A patch 17 may be sewn over the primary call holder 14 to help secure the primary call holder 14 to wrist strap 12, as illustrated in FIG. 4. The primary call holder 14 may also be attached to the wrist strap 12 by means other than sewing the primary call holder 14 to the wrist strap, including the use of snaps, buttons with button holes, clamps, buckles, hook-and-loop fasteners, adhesive glue, and other common means for attaching materials together, and remain within the scope of this invention.

Figure 2:
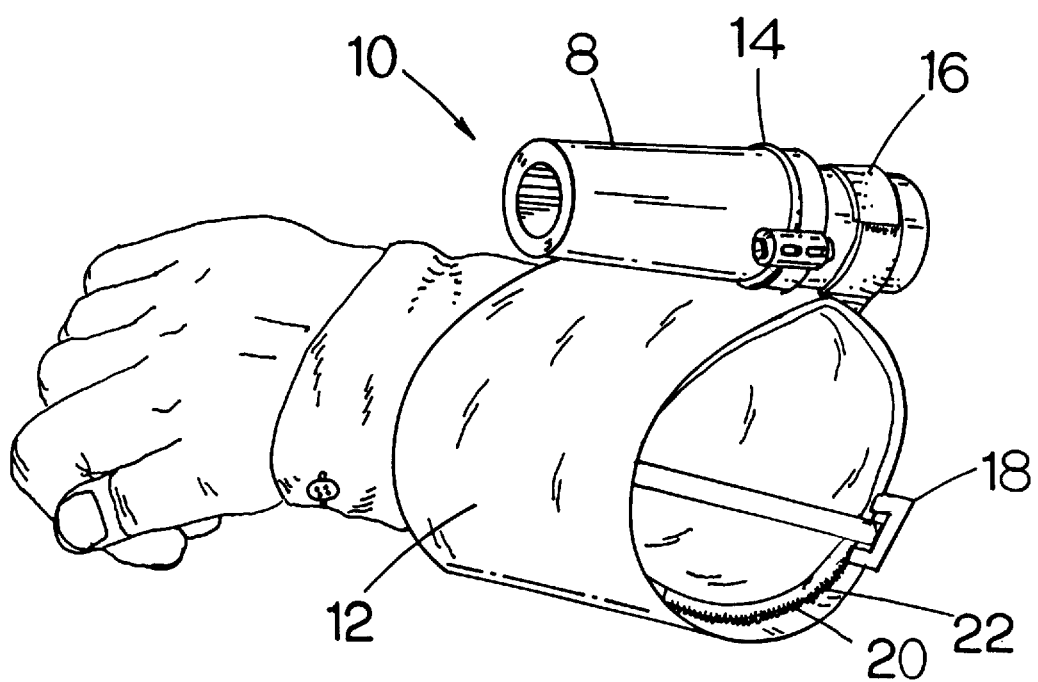
FIG. 2 is perspective view of the hand free game call holder attached to the hunter's wrist.

As shown in FIGS. 5, the opposing ends 28 of the elastic cord 25 are threaded through a cord clamp 30 to create a loop through which the game call 8 is inserted. The elastic cord 24 is aligned with the game call 8 so that the cord seats into a lanyard groove in the game call 8, as shown in FIG. 2. The cord clamp 30 is used to pull the elastic cord 24 taut around the game call 8 and clamps down on the elastic cord 24 to secure the game call 8 within the elastic cord 24 so that the game call 8 cannot work itself loose or be easily jarred from the primary call holder 14. The cord clamp 30 may be any type of mechanism which is used to prevent the elastic cord 24 from sliding through the cord clamp 30 when in a clamping position, such as a Barrel Type cord clamp available through Valley Products of York New Salem, Pa., and remain within the scope of this invention.

Because the elastic cord 24 length is adjustable using the cord clamp 30, the primary call holder 14 can hold a wide range of game calls 8 having various sizes, including deer, duck, goose, elk, and rodent calls. These calls have all been traditionally designed around the lanyard type arrangement.

Figure 6:
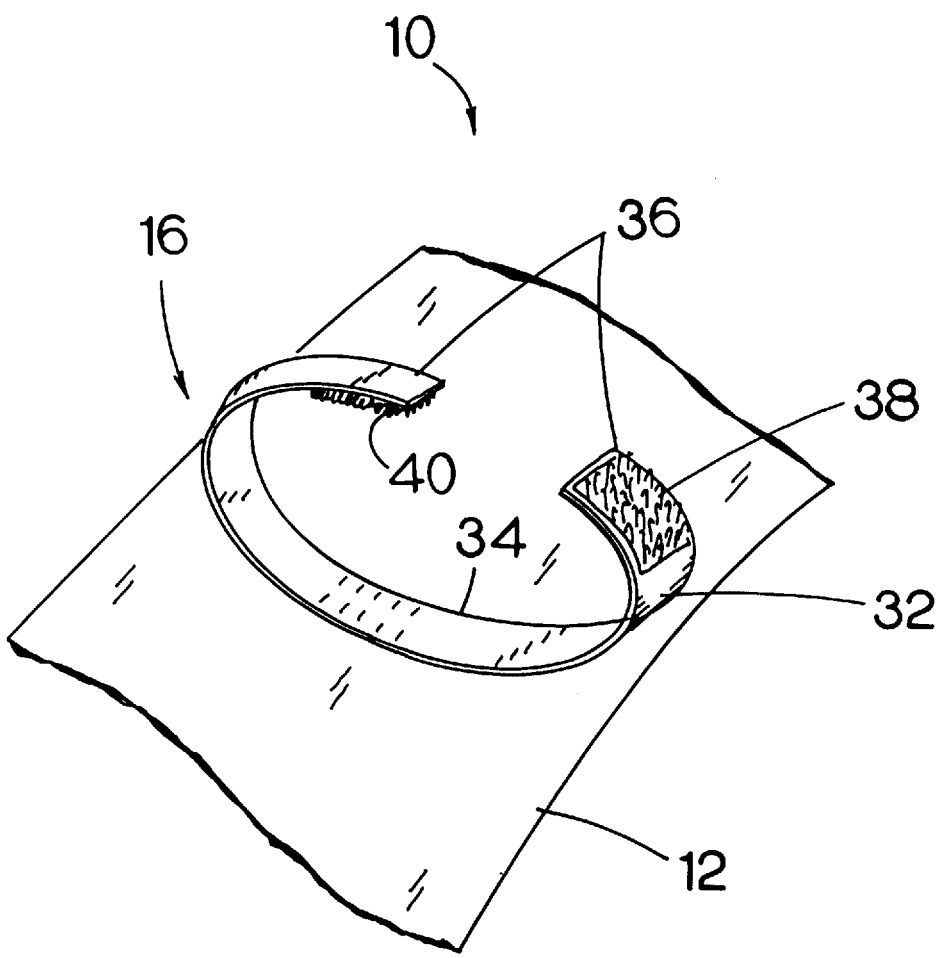
FIG. 6 is a perspective view of a call holder consisting of a strap attached to a wrist strap.

The secondary call holder 16 is used to further secure lanyard type game calls and to hold game calls which do not have lanyard grooves. The secondary call holder 16, in the preferred embodiment and as illustrated in FIG. 6, is a strap 32 having opposing ends 36 and a central portion 34 therebetween. The central portion 3 is sewn, in the preferred embodiment, onto the top of the wrist strap 12 to securely attach the secondary call holder 16 to the wrist strap 12. A patch 17 may be sewn over the secondary call holder 16 to help secure the secondary call holder 16 to wrist strap 12, as illustrated in FIG. 4.

The secondary call holder 16 may be attached to the wrist strap 12 by means other than sewing the secondary call holder 16 to the wrist strap 12, including the use of snaps, buttons with button holes, clamps, buckles, hook-and-loop fasteners, adhesive glue, and other common means for attaching materials together and remain within the scope of this invention.

In the preferred embodiment, one of the opposing ends 36 of strap 32 has an arrangement of hooks 38 thereon, while the other opposing end 36 of the strap 32 has an arrangement of loops 40, such that the strap 32 may be wrapped around the game call 8 and the ends of the straps 32 may be fastened together as a hook-and-loop fastener. Using the hook and loop fastener, the strap 32 is adjustable to a wide range of game call sizes. However, the fastener used to fasten the ends of the secondary call holder together may be of a type other than a hook-and-loop fastener, including snaps, buttons and other common types of fasteners and remain within the scope of this invention.

As shown in FIG. 4, the second call holder 16, in a second embodiment may consist of a second elastic cord 24 and cord clamp 30, as shown in FIG. 4. In this embodiment, the two cords would be tightened about and would secure the game call 8 to the wrist strap 12, rather than an elastic cord 24 and a strap 32.

The primary call holder 14 and the secondary call holder 16 are attached to the wrist strap 12 in alignment so that they can work in conjunction with each other to securely hold a game call 8. The primary call holder 14 and the secondary call holder 16 are positioned to hold the game call in a position on the wrist so that it is accessible to the hunter while the hunter is holding a firearm or bow.

Figure 3:
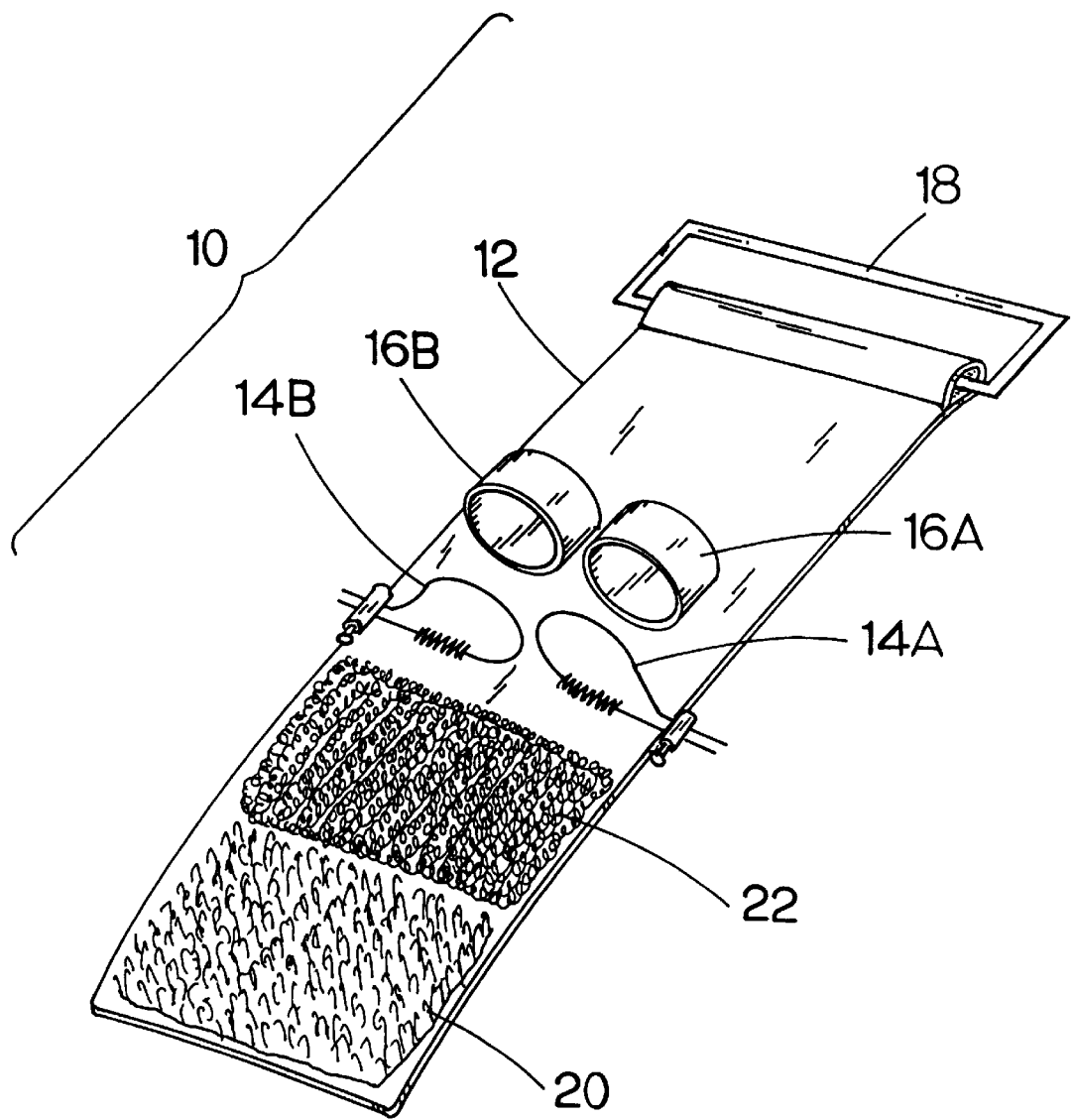
FIG. 3 is a perspective view of the hands free game call holder unattached from a hunter's wrist and showing provision for holding a pair of game calls.

FIG. 3 discloses an alternative embodiment in which a pair of primary game call holders 14 and a pair of secondary game call holders 16 are attached to the top of the wrist strap 12 such that a pair of game calls 8 are held on the hunter's wrist.

The materials contemplated to be within the scope of this invention may be of various colors or camouflage patterns. The various arrangements for attaching the primary call holder 14, secondary call holder 16 and D-Ring 18, that may include sewing, buttons with button holes, clamps, buckles, snaps, hook and loop fasteners, glue, adhesives, threading through openings and by other common types of fastening means, are not illustrated, in that these arrangements are only various means of fastening the components together and are not require for the understanding of the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings, including any given dimension shall be interpreted as illustrative and not in a limiting sense.

What is claimed is:

1. A hands free game call holder for holding a game call comprising:

a wrist strap attachable to the wrist of a hunter, said strap being of a flexible material, having a central portion and a first end and a second end;

a fastening means for providing means of adjusting tension and securing said wrist strap to the wrist of the hunter, said fastening means having a D-ring attached to said first end of said wrist strap, said second end of said wrist strap looped thorough said D-ring and folded back and removably secured onto itself;

a primary call holder having a central portion and two opposing ends, said central portion attached to said central portion on said wrist strap, said opposing ends adapted to be pulled taut in a loop about the game call to securely hold game calls of various sizes on said wrist strap, said primary call holder comprises an elastic cord, and a cord clamp, said opposing ends of said elastic cord threaded through said cord clamp to create an adjustable loop that is tightenable and securable about the game call; and a secondary call holder having a central portion and two opposing ends, said central portion attached to said central portion of said wrist strap, said opposing ends adapted to wrap about the game call and fastened together to firmly secure the game call on said wrist strap, said primary call holder and said secondary call holder being aligned and working in conjunction to securely hold the game call in a position on the wrist accessible to the hunter while the hunter is holding a firearm or bow.

2. A hands free game call holder for holding a game call comprising:

a wrist strap attachable to the wrist of a hunter, said strap being of a flexible material, having a central portion and a first end and a second end;

a fastening means for providing means of adjusting tension and securing said wrist strap to the wrist of the hunter, said fastening means having a D-ring attached to said first end of said wrist strap, said second end of said wrist strap looped thorough said D-ring and folded back and removably secured onto itself;

a primary call holder having a central portion and two opposing ends, said central portion attached to said central portion on said wrist strap, said opposing ends adapted to be pulled taut in a loop about the game call to securely hold game calls of various sizes on said wrist strap; and a secondary call holder having a central portion and two opposing ends, said central portion attached to said central portion of said wrist strap, said opposing ends adapted to wrap about the game call and fastened together to firmly secure the game call on said wrist strap, said secondary call holder comprises an elastic cord, and a cord clamp, said opposing ends of said elastic cord threaded through said cord clamp to create an adjustable loop wrapped and tightened about the game call to securely hold the game call on said wrist strap, said primary call holder and said secondary call holder being aligned and working in conjunction to securely hold the game call in a position on the wrist accessible to the hunter while the hunter is holding a firearm or bow.

3. A hands free game call holder for holding a game call comprising:

a wrist strap attachable to the wrist of a hunter, said strap being of a flexible material, having a central portion and a first end and a second end;

a fastening means for providing means of adjusting tension and securing said wrist strap to the wrist of the hunter, said fastening means having a D-ring attached to said first end of said wrist strap, said second end of said wrist strap looped thorough said D-ring and folded back and secured onto itself by a securing means selected from the group consisting of hook and loop fastener, buttons and button holes, snaps, clamps and buckles;

a primary call holder comprising an elastic cord, and a cord clamp, said elastic cord having a central portion and two opposing ends, said central portion attached to said central portion on said wrist strap, said opposing ends of said elastic cord threaded through said cord clamp to create an adjustable loop that is tightenable and securable about the game call, to securely hold game calls of various sizes on said wrist strap; and a secondary call holder comprising a strap having a central portion and two opposing ends, said central portion attached to said central portion of said wrist strap, said opposing ends of said strap adapted to be wrapped and tightened about the game call, said opposing ends fastened together to securely hold the game call on said wrist strap, said opposing ends fastened together with a fastening means, said fastening means selected from the group consisting of hook and loop fastener, buttons and button holes, snaps, clamps and buckles, said primary call holder and said secondary call holder being aligned and working in conjunction to securely hold the game call in a position on the wrist accessible to the hunter while the hunter is holding a firearm or bow.

4. A hands free game call holder for holding a game call comprising:

a wrist strap attachable to the wrist of a hunter, said strap being of a flexible material, having a central portion and a first end and a second end;

a fastening means for providing means of adjusting tension and securing said wrist strap to the wrist of the hunter, said fastening means having a D-ring attached to said first end of said wrist strap, said second end of said wrist strap looped thorough said D-ring and folded back and secured onto itself by a securing means selected from the group consisting of hook and loop fastener, buttons and button holes, snaps, clamps and buckles;

a primary call holder comprising an elastic cord, and a cord clamp, said elastic cord having a central portion and two opposing ends, said central portion attached to said central portion on said wrist strap, said opposing ends of said elastic cord threaded through said cord clamp to create an adjustable loop that is tightenable and securable about the game call, to securely hold game calls of various sizes on said wrist strap;

a secondary call holder comprising a strap having a central portion and two opposing ends, said central portion attached to said central portion of said wrist strap, said opposing ends of said strap adapted to be wrapped and tightened about the game call, said opposing ends fastened together to securely hold the gate call on said wrist strap, said opposing ends fastened together with a fastening means, said fastening means selected from the group consisting of hook and loop fastener, buttons and button holes, snaps, clamps and buckles, said primary call holder and said secondary call holder attached to said central portion of said wrist strap by an attachment means selected from the group consisting of hook and loop fastener, sewing, snaps, buttons, adhesives and looped through openings in said wrist strap;

said primary call holder and said secondary call holder being aligned and working in conjunction to securely hold the game call in a position on the wrist accessible to the hunter while the hunter is holding a firearm or bow.

5. A hands free game call holder for holding game calls comprising:

a wrist strap attachable to the wrist of a hunter, said strap being of a flexible material, having a central portion and a first end and a second end;

a fastening means for providing means of adjusting tension and securing said wrist strap to the wrist of the hunter, said fastening means having a D-ring attached to said first end of said wrist strap, said second end of said wrist strap looped thorough said D-ring and folded back and secured onto itself by a securing means selected from the group consisting of hook and loop fastener, buttons and button holes, snaps, clamps and buckles;

a primary call holder comprising an elastic cord, and a cord clamp, said elastic cord having a central portion and two opposing ends, said central portion attached to said central portion on said wrist strap, said opposing ends of said elastic cord threaded through said cord clamp to create an adjustable loop that is tightenable and securable about the game call, to securely hold game calls of various sizes on said wrist strap;

a secondary call holder comprising a strap having a central portion and two opposing ends, said central portion attached to said central portion of said wrist strap, said opposing ends of said strap adapted to be wrapped and tightened about the game call, said opposing ends fastened together to securely hold the game call on said wrist strap, said opposing ends fastened together with a fastening means, said fastening means selected from the group consisting of hook and loop fastener, buttons and button holes, snaps, clamps and buckles, said primary call holder and said secondary call holder being aligned and working in conjunction to securely hold the game call in a position on the wrist accessible to the hunter while the hunter is holding a firearm or bow and;

a second primary call holder attached to said wrist strap adjacent to said primary call holder; and a second secondary call holder attached to said wrist strap adjacent to said secondary call holder, said second primary call holder and said second secondary call holder in alignment and adapted to hold a second game call on said wrist strap, said game call and said second game call being held parallel to each other on said wrist strap.

* * * * *